US008459066B2

(12) United States Patent
Kim et al.

(10) Patent No.: US 8,459,066 B2

(45) Date of Patent: Jun. 11, 2013

(54) INPUT DEVICE OF WASHING MACHINE AND CONTROL METHOD OF THE SAME

(71) Applicants: Myung Shik Kim, Changwon-si (KR); Jong Hee Han, Changwon-si (KR); Ho Il Jeon, Changwon-si (KR)

(72) Inventors: Myung Shik Kim, Changwon-si (KR); Jong Hee Han, Changwon-si (KR); Ho Il Jeon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/707,242

(22) Filed: Dec. 6, 2012

(65) Prior Publication Data

US 2013/0093586 A1 Apr. 18, 2013

Related U.S. Application Data

(62) Division of application No. 12/320,991, filed on Feb. 10, 2009, now Pat. No. 8,347,657.

(30) Foreign Application Priority Data

Feb. 11, 2008 (KR) ........................ 10-2008-0012194

(51) Int. Cl.

*G05B 23/02* (2006.01)
*G05B 23/00* (2006.01)
*D06F 33/00* (2006.01)
*D06F 39/08* (2006.01)

(52) U.S. Cl.

USPC ........ 68/12.27; 340/526; 340/3.71; 68/12.01; 68/12.22

(58) Field of Classification Search

None

See application file for complete search history.

(56) References Cited

U.S. PATENT DOCUMENTS

| | | | |
|---|---|---|---|
| 3,707,882 | A | 1/1973 | Burkall |
| 7,653,955 | B2 | 2/2010 | Jo et al. |
| 2003/0184597 | A1 | 10/2003 | Jo et al. |
| 2007/0119484 | A1 | 5/2007 | Kwon et al. |

FOREIGN PATENT DOCUMENTS

| | | | |
|---|---|---|---|
| DE | 198 34 229 | A1 | 2/2000 |
| DE | 100 35 642 | C1 | 12/2001 |
| DE | 297 14 901 | U1 | 8/2003 |

*Primary Examiner* — Brian Zimmerman

*Assistant Examiner* — Omeed Alizada

(74) *Attorney, Agent, or Firm* — McKenna Long & Aldridge

(57) ABSTRACT

An input device of a washing machine and a control method of the same are disclosed. An input device of a washing machine includes an operation part generating a plurality of identical signals for washing course designation, a control part controlling one of a plurality of preset washing courses to be designated sequentially according to a predetermined order if the signal is generated by the operation part and a display part displaying the washing course designated by the control part. A control method of an input device of a washing machine for washing course selection includes generating a plurality of identical signals by a user's operation, designating one of a plurality of preset washing courses separately according to a predetermined order whenever the signal is generate, and displaying the designated washing course.

7 Claims, 3 Drawing Sheets

INPUT DEVICE OF WASHING MACHINE AND CONTROL METHOD OF THE SAME

CROSS REFERENCE TO RELATED APPLICATION

This application is a divisional application of U.S. patent application Ser. No. 12/320,991 filed Feb. 10, 2009, which claims the benefit of the Patent Korean Application No. 10-2008-0012194, filed on Feb. 11, 2008, each of which is hereby incorporated by reference as if fully set forth herein.

BACKGROUND OF THE DISCLOSURE

1. Field of the Disclosure

The present invention relates to an input device of a washing machine and a control method of the same.

2. Discussion of the Related Art

Washing machines are electric appliances which wash or dry clothes, cloth items, beddings and the like (hereinafter, laundry). Here, a single washing machine is referenced to as an apparatus capable of performing only washing or drying or performing both washing and drying.

Recently have been released washing machines including a steam supply device to have a refresh function of removing wrinkles, unpleasant smell, static electricity of laundry.

A conventional washing machine includes a cabinet and a control panel. The cabinet defines an exterior appearance of the washing machine and a user inputs various commands through the control panel. Specifically, the control panel allows the user to select washing courses and the selected washing course enables washing automatically performed according to a preset condition. Here, a plurality of washing courses may be preset in the washing machine.

FIG. 1 is a perspective view illustrating an exterior appearance of a conventional washing machine. Describing the exterior appearance of the washing machine in reference to FIG. 1, the conventional washing machine includes a cabinet 1 and a control panel 10. The cabinet 1 defines an exterior appearance of the washing machine and the control panel 10 is provided on a front or upper surface of the cabinet 1 for a user to input various commands.

The control panel 10 includes a rotary knob 11, a plurality of selection buttons 12, a display 13, a power button 14 and a start button 15. The user selects washing courses, rotating the rotary knob 11 and the user also selectively adjusts specific selection of the washing courses through the selection buttons 12. The display 13 displays an operational state.

Here, the washing courses are washing conditions preset to perform washing according to an object of washing selected by the user and the kind of laundry fabric. Commonly, a plurality of washing courses may be preset in the washing machine, for example, a normal, sanitary, quiet, sheet, baby clothes, lingerie/wool and functional clothes wash. If the user selects one of the washing courses, corresponding washing is performed according to the temperature and washing time preset in each corresponding washing course.

The user may select one of the plural washing courses according to an object of the washing or the kind of laundry fabric and washing may be performed automatically according to the selected washing course. That is, the washing courses enable desired washing of laundry to be automatically performed even without the user's selection of specific conditions of washing, for example, the temperature and amount of water, the repeated number of washing, rinsing and dry-spinning.

The control panel 10 may include an encoder (not shown) connected with a circuit board, that is, a rotational center of the rotary knob 11 to generate a different control signal according to each rotational angle of the rotary knob 11.

Here, each of the control signals is corresponding to each of the washing courses. A washing course display part 16 may be provided adjacent to the rotary knob 11 to display the washing course corresponding to each of the control signals in letters. An LED 17 may be provided between the rotary knob 11 and the washing course display part 16 to make the selected washing course display part 16 to be luminescent as the rotary knob 11 is rotated. As rotating the rotary knob 11, the user can adjust a desired washing course to be selected, using the LED 17 and the washing course display part 16.

However, according to the conventional washing machine having the above configuration, the number and kind of the conventional washing courses should be determined in manufacturing the washing machine, because the washing course display part is printed on the surface of the control panel. After the manufacture of the washing machine, it is impossible to change the number and the kind of the washing courses.

The washing courses are preset washing methods corresponding to the user's request or the kind of laundry fabric. The user's request or the kind of laundry fabric could be changeable according to the times. If a new washing course is added, the user should purchase a new washing machine inconveniently.

If the print is erased, the user might have difficulties in selecting washing courses because he/she fails to identify which washing course is selected. This could results in a serious problem when using the washing machine.

A washing course display part provided in the conventional washing machine is printed on a surface of the control panel to display washing courses. Because of that, the exterior appearance of the washing machine happens to look substantially less luxurious.

In addition, if the user operates the control panel of the conventional washing machine in a dark atmosphere, the user cannot see the washing course display part printed on the surface of the control panel.

SUMMARY OF THE DISCLOSURE

Accordingly, the present invention is directed to an input device of a washing and a control method of the same.

An object of the present invention is to provide an input device of a washing machine and a control method of the same, which can display a selected washing course, without printing a plurality of washing courses on a surface of a control panel, and of confirming the displayed washing course.

Another object is to provide an input device of a washing machine and a control method of the same, which enables a user to identify a selected washing course even in a dark atmosphere.

A still further object is to provide an input device of a washing machine and a control method of the same, which can change a plurality of washing courses preset in a manufacturing process and add a new one to the washing courses.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an input device of a washing machine includes an operation part generating a plurality of identical signals for washing course designation; a control part controlling one of a plurality of preset washing courses to be designated sequentially according to a predetermined order if the signal is generated by the operation part; and a display part displaying the washing course designated by the control part.

In this case, the display part is a single display unit.

The single display unit comprising a LCD.

The operation part is rotatable along a rotation section formed by a plurality of unit sections connected with each other and the signal for the washing course designation is generated whenever the operation part is rotated to a single unit section.

The operation part generates a different signal according to a rotation direction thereof, and the control part controls the preset washing courses to be designated sequentially according to a predetermined order if the operation part is rotated in a clockwise direction and the control part controls the preset washing courses to be designated sequentially according to a reverse order if the operation part is rotated in a counter-clockwise direction.

The control part controls the washing course displayed on the display part to be confirmed if the operation part is pushed in a rotational center direction.

The control part controls the washing course displayed on the display part to be confirmed if no signal for the washing course designation is generated by the operation part for a predetermined time period.

The input device may further include an auxiliary confirmation button, wherein the control part controls the washing course displayed on the display part to be confirmed by the confirmation button.

In the meanwhile, the operation part is configured of a button type and the button type operation part generates the signal whenever being pushed.

The display part may include a plurality of light emitting parts.

The input device may further include a selection button for a user to identify a washing condition preset in the washing course; and an adjustment button for the user to change the washing condition selected by the selection button.

The washing conditions comprises one of the temperature of wash water, the number of dry-spinning, the number of rinsing and the amount of wash water.

In another aspect, a control method of an input device of a washing machine for washing course selection includes generating a plurality of identical signals by a user's operation; designating one of a plurality of preset washing courses separately according to a predetermined order whenever the signal is generate; and displaying the designated washing course.

In this case, the control method of an input device of a washing machine for washing course selection may further include confirming the displayed washing course.

The confirming the displayed washing course is performed if no signal generated by the user's operation is generated for a predetermined time period after one of the preset washing courses is designated.

The confirming the displayed washing course is performed if a separate signal for washing course confirmation is supplied by the user after one of the preset washing courses is designated.

The control method of an input device of a washing machine for washing course selection may further include displaying undefined one of the washing courses when the washing machine is turned on prior to the step of generating a plurality of identical signals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
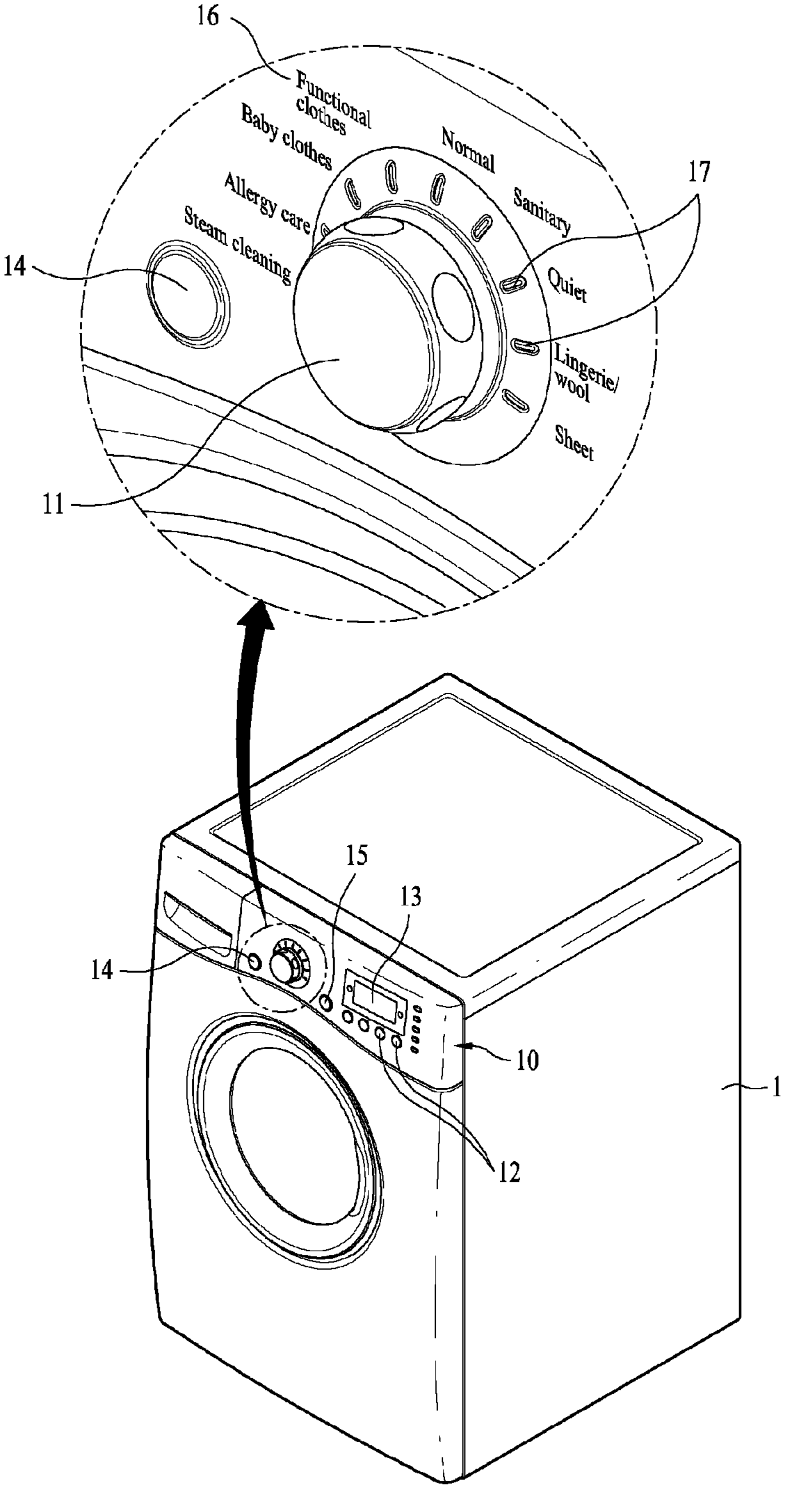
FIG. 1 is a diagram illustrating an exterior appearance of a conventional washing machine.
Figure 2:
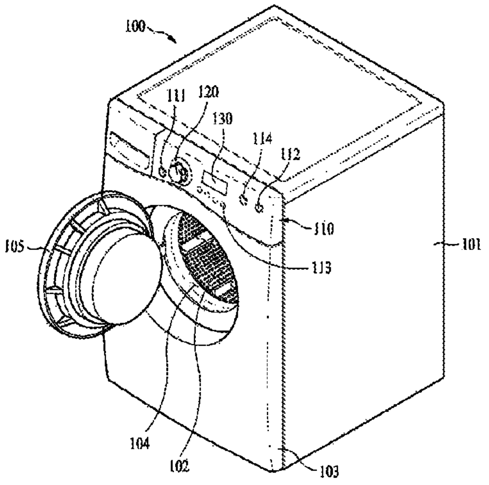
FIG. 2 is a diagram illustrating a washing machine according to an exemplary embodiment of the present invention.

FIG. 2 illustrates a washing machine according to an exemplary embodiment of the present invention. Next, in reference to FIG. 2, the washing machine according to the exemplary embodiment of the present invention will be described to overcome the disadvantages of the conventional washing machine.

The washing machine 100 according to the present invention includes a cabinet 101, a tub (not shown), a drum 102, a motor (not shown), a cover 103 and a door 105. The cabinet 101 defines an exterior appearance of the washing machine. The tub (not shown) is mounted in the cabinet 101 to receive wash water. The drum 102 is rotatable in the tub to receive laundry. The motor (not shown) is mounted to a rear of the tub to rotate the drum 102. The cover 103 is provided at a front of the cabinet 101, with an opening 104 through which the laundry is loaded or unloaded. The door 105 is rotatably coupled to the cover 103 to open and close the opening 104.

The washing machine 100 may further include a control panel 110 provided on an upper portion of a front surface of the cabinet 101 and the control panel 110 includes various buttons for the user to operate the operation of the washing machine 100.

The control panel 110 includes an operation part 120, a display part 130, a power button 111 and a start button 112. The user selects (designates and confirms) a washing course through the operation part 120. The display part 130 displays the selected washing course and an operational state of the washing machine.

The washing machine 100 may further include a hot air supply device (not shown) which supplies hot air to the drum 102 and a steam supply device (not shown) which supplies steam to the drum 102.

The hot air supply device supplies hot air to the drum 102 to dry the laundry received in the drum 102. The steam supply device supplies steam generated while heating water to the drum 102 to refresh the laundry, specifically, to remove wrinkles, unpleasant smell, static electricity of the laundry received in the drum 102. The structure of the hot air supply device and the steam supply device is well-known to a person to which the art pertains and thus the detailed description thereof will be omitted.

Since the washing machine 100 may include the hot air supply device and the steam supply device as mentioned above, the washing machine 100 according to the present invention may have a washing course of drying and a washing course of using steam. As a result, the user may select substantially more various kinds of washing courses, for example, a drying, allergy care, and steam cleaning course.

At the control panel 110 may be provided a plurality of selection buttons 113 and an adjustment button 114. The user may select specific selection modes each having a preset value, for example, the temperature of wash water and the washing time stored in each of the washing courses, through the selection buttons 113. The user may adjust the selected specific selection modes, for example, the washing time, using the adjustment button 114. They are provided for the user to adjust the temperature of wash water, the repeated number of dry-spinning or rinsing and the amount of water as needed, even if the user has selected the washing course.

As he/she operates the control panel, the user may select one of washing courses to be designated and confirmed according to a desired washing object and adjust the specific settings of the selected washing course.

Figure 3:
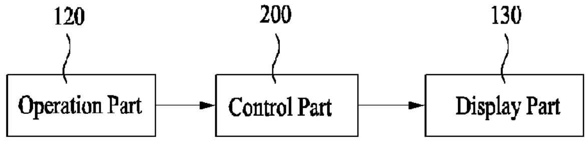
FIG. 3 is a diagram schematically illustrating an input device of the washing machine according to the embodiment.

FIG. 3 schematically illustrates an input device of the washing machine according to the present invention. Next, in reference to FIGS. 2 and 3, the input device will be described.

The input device of the washing machine includes an operation part 120, a control part 200 and a display part 130. The operation part 120 generates a signal for washing course designation. The control part 200 controls a plurality of preset washing courses to be sequentially designated in a predetermined order, if the signal is generated by the operation part 120. The display part 130 displays the washing course designated by the control part 200.

The signals generated by the operation part 120 are identical signals generated by the user's operation, not unique signals corresponding to the washing course. Whenever receiving the signal from the operation part 120, the control part 200 controls the corresponding one of the preset washing courses to be displayed on the display part 130 in the predetermined order.

The input device of the washing machine 100 according to the exemplary embodiment is different from the kind in which the plurality of washing courses are printed on the surface of the control panel 110 in letters and from the kind which generates a unique control signal corresponding to one of the washing courses by the user's operation.

In the input device according to the present invention, the plurality of the washing courses may be preset in the control part 200 sequentially according to the predetermined order. The user operates the operation part 120 to generate the signal. The control part 200 designates one of the washing courses in the preset order, whenever receiving the signal from the operation part 120, to display the designated washing course on the display part 130.

It is preferable that the operation part 120, the display part 130 and the control part 200 are provided at the control panel 110 and the present invention is not limited thereto. For example, the operation part 120 and the display part 130 may be provided at the control panel 110 and the control part 200 may be provided in another position inside the washing machine 100. If then, the signal transmission between the operation part 120 and the display part 130 and the control part 200 may be performed via a wire or wirelessly.

The plurality of the washing courses are not printed on the surface of the control panel and it is preferable that the washing courses designated by the control part 200 are displayed on the display part 130 in letters.

For example, the display part 130 may be configured of a single display unit like a LCD. If then, the washing courses designated by the control part 200 may be displayed on the LCD in letters. Here, the display part 130 may include a plurality of light emitting parts (not shown) for the user to identify the washing courses without any difficulties even in a dark atmosphere.

As a result, the user operates the operation part 120 and changes each of the washing courses preset in the control part 200 in the predetermined order. Also, the user may designate a desired washing course, identifying the designated washing course displayed on the display part 130.

In the meanwhile, the operation part 120 may be movable in a predetermined rotation section. A plurality of unit sections is connected with each other to form an overall rotation section.

The rotation section may be divided into the plurality of unit sections. In addition, the operation part 120 may be rotated to one of the unit sections whenever the user operates the operation part 120 one time. As a result, the rotation of the operation part 120 is stoppable between the two adjacent unit sections.

The above structure of the operation part enables a single identical signal to be generated whenever the user rotates the operation part 120 to a single unit section. According to the generated signal, the control part 200 designates one of the washing courses in the predetermined order and displays the designated one on the display part 130.

Here, the operation part 120 may generate a different signal according to a rotational direction. Then, the control part 200 designates the preset washing courses in the predetermined order if the operation part 120 is rotated in a clockwise direction to generate a signal. If the operation part 120 is rotated in a counter-clockwise direction to generate a signal, the control part 200 may designate the preset washing courses in a reverse order.

If the signal is not transmitted by the operation part 120 for a predetermined time period, the control part 200 may confirm the washing course displayed on the display part 130. That is, if the user operates the washing machine according to desired washing courses, the user operates the operation part 120. Hence, if a desired one of the washing courses designated in the control part 200 is displayed on the display part 130, the user may wait for a predetermined time period, without any operation of the operation part 120, to confirm the displayed washing course.

Alternatively, if the operation part 120 is pushed in a perpendicular direction of a rotation level of the operation part 120, the control part 200 may confirm the displayed washing course. Here, the rotation level of the operation part 120 may include a rotational center of the operation part 120 if the operation part 120 is able to rotate and it means a level parallel to a lower surface of the operation part 120. For that, it is preferable that the operation part 120 generates a different signal in case of being rotated from a signal in case of being pushed. As a result, if seeing a desired one of the washing courses designated in the control part 200 by the display part 130, with rotating the operation part 120 to each of the unit sections, the user may push the operation part 120 to confirm the desired washing course.

Of course, an auxiliary confirmation button (not shown) may be provided on the control panel. If the user pushing the confirmation button, the control part 200 confirms the washing course displayed on the display part 130.

The input device of the washing machine according to the exemplary embodiment of the present invention may include the start button 112 to start washing according to the confirmed washing course.

If the start button 112 is pushed, the control part 200 confirms the washing course displayed on the display part 130 and the control part 200 starts washing according to the confirmed washing course. That is, the start button 112 is employed as a confirmation button capable of confirming the washing course displayed on the display part 130.

Alternatively, the operation part 120 is provided in a button-type capable of generating a single identical signal whenever being pushed. That is, the user pushes the operation part 120 one time, not rotating the operation part 120, to change one of the washing courses into another in a predetermined order. Here, the control part 200 controls the washing course displayed on the display part 130 to be confirmed according to the user's operation of an auxiliary confirmation button (not shown) or if no signal is generated from the operation part 120 for a predetermined time period.

The predetermined order of the washing courses preset by the control part 200 may be changeable. The user can change the display order of the washing courses displayed on the display part 130 after being designated by the control part 200 as needed. For that, an auxiliary change button may be further provided.

As mentioned above, according to the input device of the washing machine according to the present invention, the plurality of the washing courses may be stored by the control part 200 in the predetermined order and the signal may be generated by the operation part 120 for the control part to designate or to display one of the preset washing courses on the display part. Even if the stored washing courses stored in the control part 200 are changed or new ones are added, the user can select the changed or added washing course. If then, the newly changed or added washing course may be displayed on the display part 130 in letters.

The input device of the washing machine may include the selection button 113 and the adjustment button 114. The user identifies washing conditions preset in the washing courses, operating the selection button 113, and the user may adjust preset values of the selected washing conditions, using the adjustment button 114.

Here, the washing conditions may include the temperature of wash water, the repeated number of dry-spinning or rinsing and the amount of wash water. The selection button 113 may be provided for each of the plural washing conditions correspondingly.

It is common that such the washing conditions are preset in the washing courses. Once the user selects (designates and confirms) the washing course, it is unnecessary to adjust the washing conditions additionally. As needed, the user may select one of the washing courses and adjust the corresponding washing conditions of the selected washing course. That is, the selection button 113 and the adjustment button 114 are provided for the user to change the washing conditions of the preset washing courses as needed.

For example, if the user selects one of the washing courses and tries to change the preset amount of wash water of the selected washing course, the user selects a button corresponding to the amount of wash water out of the plurality of the selection buttons 113 and adjusts the adjustment button 114 to determine the desired amount of wash water.

For example, the adjustment button 114 may be rotatable and a preset value of the washing condition may be changed whenever the user rotates the adjustment button 114.

Figure 4:
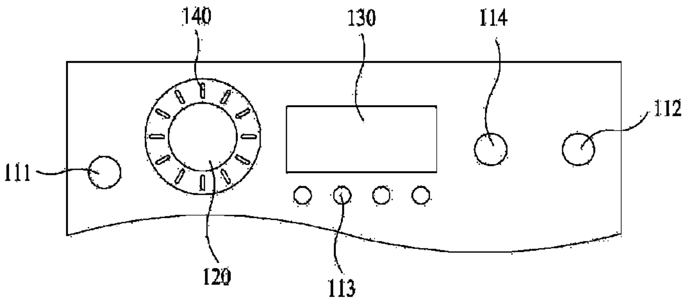
FIG. 4 is a diagram illustrating a washing machine according to another embodiment of the present invention.

FIG. 4 illustrates an input device according to another embodiment.

This embodiment present the same configuration as the above embodiment, except a plurality of light emitting parts 140 illuminating around the operation part 120. The identical numerous references and descriptions are adapted to refer the identical elements of the configuration.

In reference to FIG. 4, the input device of the washing machine according to this embodiment may further include a plurality of light emitting parts provided adjacent to the operation part 120.

If the operation part 120 is rotated, the control part 200 controls the light emitting parts 140 to be luminescent sequentially along the rotation of the operation part 120. Then, the user can identify the rotation direction of the operation part 120 easily and an effect of emphasizing a design characteristic of the washing machine may be expected because of the light emitting parts 140.

If the user pushes the power button 111 to turn on the washing machine, the control part 200 controls the light emitting parts 140 to be getting turned off gradually as the time passes after being luminescent or to be luminescent sequentially along a circumference of the operation part 120. This is for the effect of emphasizing the design of the washing machine as well as for the user to identify that the washing machine is turned on when the user pushes the power button 111.

Next, a control method of the input device according to the present invention will be described.

The control method of the input device used to preset washing courses of the washing machine may include a step of generating a signal by a user's operation, a step of sequentially designating one of the preset washing courses whenever the signal is generated, a step of displaying the designated washing course and a step of confirming the displayed washing course.

Here, the step of confirming the displayed washing course is performed if on signal is generated for a predetermined time period after one of the washing courses is designated in the predetermined order according to the generated signal or if a separate confirmation signal is generated by the user's operation.

Figure 5:
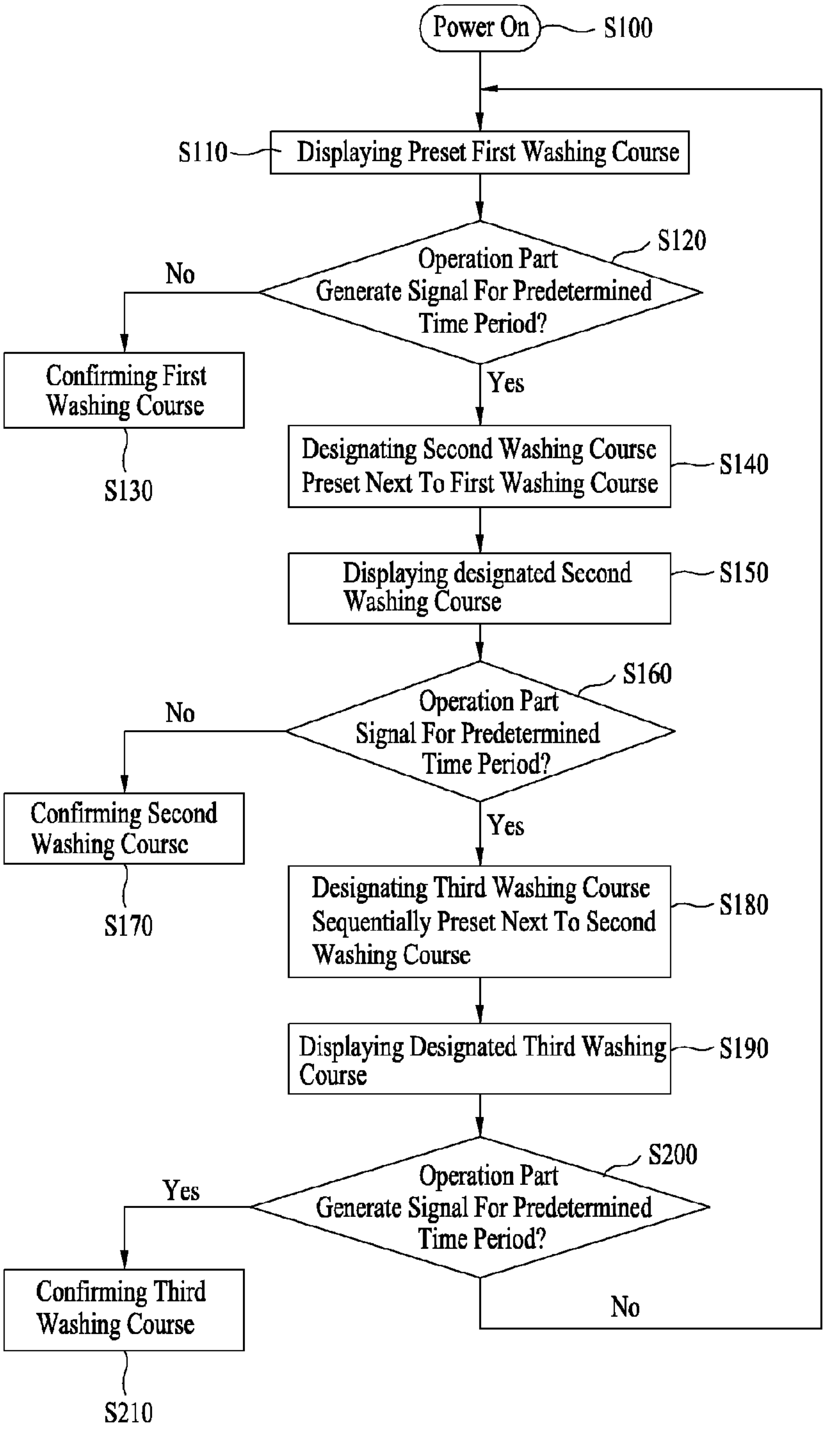
FIG. 5 is a flow chart illustrating a control method of the washing machine according to an exemplary embodiment of the present invention.

FIG. 5 is a flow chart illustrating an exemplary embodiment of the control method of the input device, in case that three washing courses are provided.

Next, in reference to FIG. 5, the control method of the input device provided with three washing courses will be described.

First of all, the power is turned on by the power button 111 (S100) and the control part 200 designates a first washing course preset as top priority of the three washing courses and it displays the first washing course on the display part 130 (S110).

However, the display part 130 can be controlled to display the first washing course when the operation part 120 is operated by the user. That is, the display part 130 displays nothing when the washing machine is turned on. But, the display part displays the first washing course when the user operates the operation part 130.

At this time, the user may operate the operation part to confirm the first washing course displayed on the display part 130, or the user may change it into another washing course and confirm the changed washing course.

That is, it is determined whether the signal is generated by the operation part 120 for the predetermined time period (S120). If no signal is generated for the predetermined time period, it is determined that the user desires to confirm the first washing course displayed on the display part 130 (S130). If the signal is generated for the predetermined time period, it is determined that the user desires to change it into a second priority washing course and a second washing course sequentially preset next to the first washing course is designated (S140). Hence, the display part 130 displays the second washing course (S150).

In the meanwhile, the step (S130) of confirming the first washing course may be performed if the user pushes the operation part 120 or the auxiliary confirmation button or the start button 112 for the predetermined time period.

It is determined whether the signal is generated by the operation part 120 for a predetermined time period after the second washing course is displayed on the display part 130 (S160). If it is determined that no signal is generated for the predetermined time period, the designated second washing course is confirmed (S170). If it is determined that the signal is generated by the operation part 120 for the predetermined time period, a third washing course sequentially preset next to the second washing course is selected (S180) and the display part 130 displays the selected third washing course (S190).

It is determined whether the signal is generated by the operation part 120 for a predetermined time period after the display part 130 displays the third washing course (S200). If it is determined that no signal is generated for the predetermined time period, the designated third washing course is confirmed (S210). If it is determined that the signal is generated for the predetermined time period, the first washing course sequentially preset next to the third washing course, that is, the first washing course preset as the top priority washing course is designated and displayed on the display part 130 (S110).

Thus, according to the control method of the input device, the user operates the operation part 120 and designates and confirms one of the preset three washing courses.

As mentioned above, this embodiment presents the control method having the preset three washing courses and this control method may be applicable regardless of the number of the preset washing courses. That is, two or more than three washing courses may be preset in the predetermined order.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A control method of an input device of a washing machine for washing course selection comprising:

generating a plurality of identical signals by a user's operation;

designating one of a plurality of preset washing courses separately according to a predetermined order whenever the signal is generate;

displaying the designated washing course by using a display part; and confirming the displayed washing course, wherein the confirming the displayed washing course is performed when no signal generated by the user's operation is generated for a predetermined time period after one of the preset washing courses is designated.

2. The control method of claim 1, wherein the confirming the displayed washing course is performed when a separate signal for washing course confirmation is supplied by the user after one of the preset washing courses is designated.

3. The control method of claim 1, further comprising:

displaying one of the washing courses when the washing machine is turned on prior to the step of generating a plurality of identical signals.

4. The control method of claim 1, wherein the plurality of identical signals are generated by rotating a operating part.

5. The control method of claim 4, wherein the operation part generates a different signal according to a rotation direction thereof, and one of the preset washing courses is designated sequentially according to a predetermined order when the operation part is rotated in a clockwise direction and according to a reverse of the predetermined order when the operation part is rotated in a counter-clockwise direction.

6. The control method of claim 4, wherein light emitting parts provided adjacent to the operation part are luminescent along with rotating the operation part.

7. The control method of claim 1, wherein the plurality of identical signals are generated by pushing a operation part.

* * * * *